Aug. 7, 1923.
F. A. YEZEK
POSTHOLE DIGGER
Filed April 5, 1922
1,464,231
3 Sheets-Sheet 3
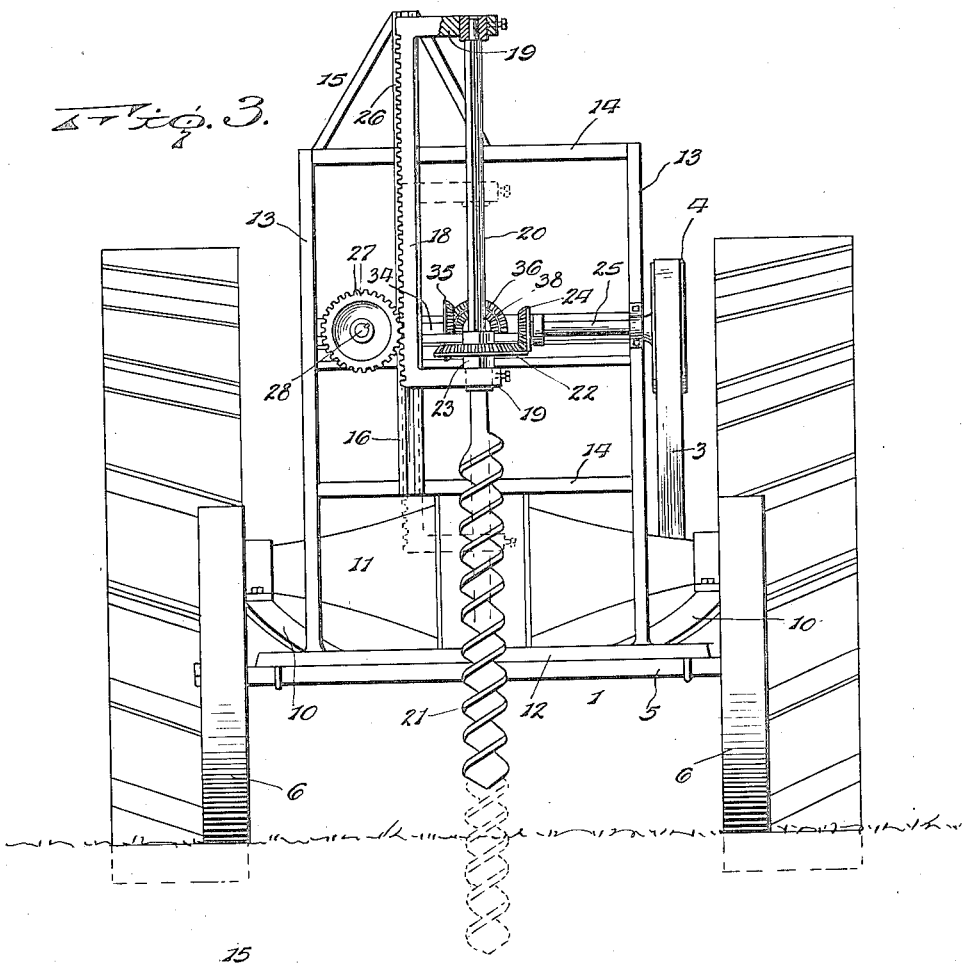

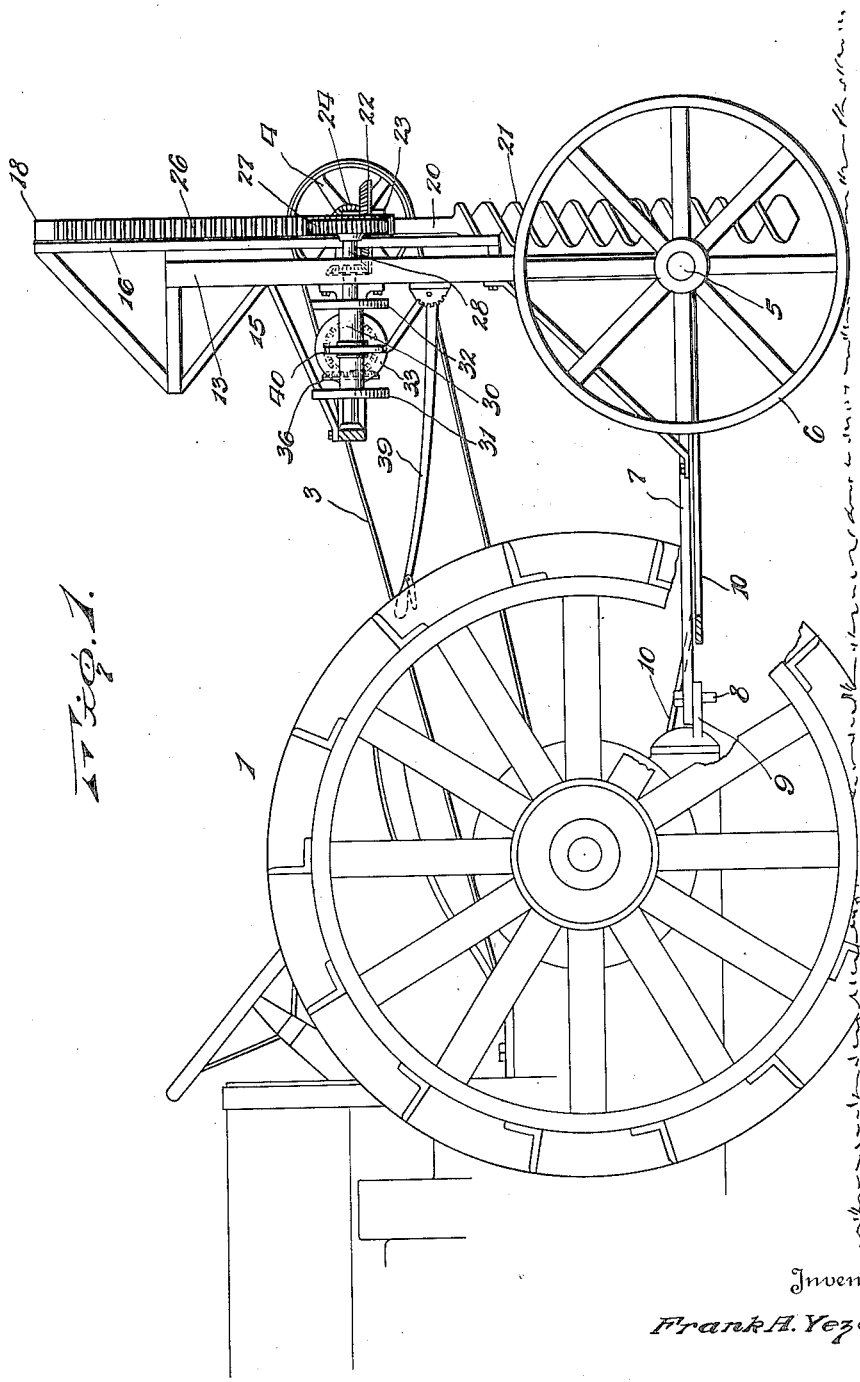

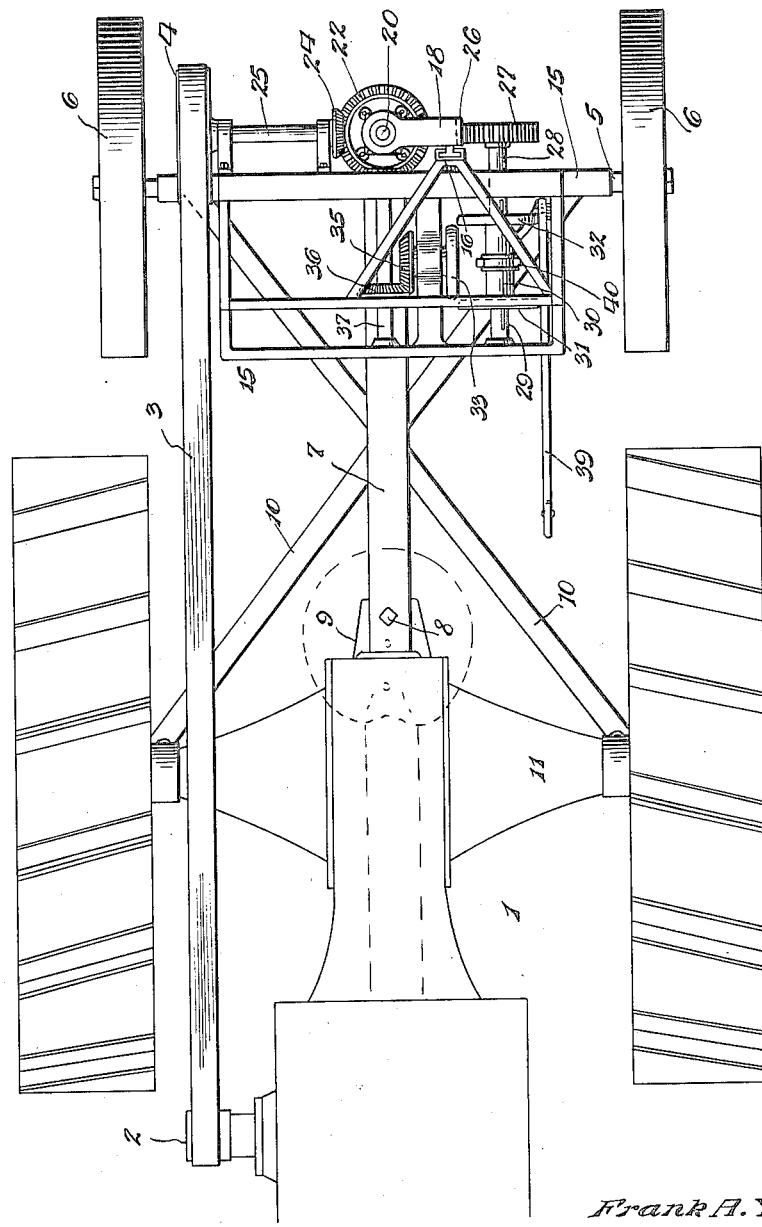

Patented Aug. 7, 1923.

1,464,231

UNITED STATES PATENT OFFICE.

FRANK A. YEZEK, OF PLYMOUTH, IOWA.

POSTHOLE DIGGER.

Application filed April 5, 1922. Serial No. 549,657.

*To all whom it may concern:*

Be it known that I, FRANK A. YEZEK, a citizen of the United States, residing at Plymouth, in the county of Cerro Gordo and State of Iowa, have invented certain new and useful Improvements in Posthole Diggers, of which the following is a specification.

This invention relates to post-hole diggers and the object is to provide a compact, strong and efficient mechanism which may be drawn from place to place by an ordinary farm tractor and, when in position, operated from the tractor. The invention provides means whereby the auger or drill will be positively driven from the tractor and will be fed to the work as the depth of the hole increases and may be easily and rapidly withdrawn when the desired depth has been reached. The invention provides an apparatus which may be easily connected to any tractor so as to be drawn from point to point thereby so that the work of forming post holes in any number may be rapidly and effectually accomplished. The invention is illustrated in the accompanying drawings and will be hereinafter fully set forth.

In the drawings—

Figure 1 is a side elevation of my improved post hole digger showing the same set up for use and showing so much of a tractor as is necessary to a complete understanding of the invention;

Fig. 2 is a plan view of the same;

Fig. 3 is a rear elevation thereof;

Fig. 4 is a view, partly in plan and partly in horizontal section, showing the operating mechanism;

Fig. 5 is a detail section on the line 5—5 of Fig. 4.

The tractor, indicated at 1, may be of any preferred type and is illustrated in a more or less conventional manner. All farm tractors known to me are equipped upon one side with a band pulley 2 which is adapted to be connected by a belt with a threshing machine or other machinery to be driven, and in the practical use of my invention I employ this pulley 2 as the actuating medium for the post-hole digger, a belt 3 being trained around the same and around a pulley 4 which forms a part of the driving mechanism of the digger, as will presently more fully appear. A belt-tightener of any approved form may be provided upon the tractor or the frame of the digger but I have deemed illustration of the same unnecessary.

In the illustrated embodiment of my invention, a truck is employed consisting of an axle 5 and ground wheels 6 rotatably mounted upon the ends of the axle. A tongue 7 is secured to and projects forwardly from the axle and is coupled by a pin or bolt 8 to the draw bar 9 which is ordinarily provided upon the tractor 1. Braces 10 are also employed and these braces are pivotally attached at their front ends to the ends of the axle housing 11 of the tractor and at their rear ends to the axle 5, the axle of the truck being thus normally maintained in parallel relation to the axle of the tractor, while at the same time permitting free steering movement of the truck whereby it will follow closely in the path of the tractor. Secured in any convenient manner to the axle 5 is a supporting frame comprising a base plate or bar 12, secured rigidly directly upon the axle, and posts or standards 13 rising from the said base at or near the ends thereof. These standards 13 are connected by cross beams 14 at suitable points and also carry a forwardly projecting supporting frame 15 which may be of any convenient form which will provide the necessary rigidity to firmly support the working mechanism. Fixed upon the said supporting frame is a vertical guide 16 consisting of a channeled bar adapted to receive the rib 17 on the front side of the drill frame 18. As shown most clearly in Fig. 3, the drill frame 18 is provided at its upper and lower ends with bearing arms 19 in which the drill spindle 20 is rotatably mounted, the drill 21 being rigidly secured to or formed integral with the lower end of the spindle 20 and being preferably of the usual earth auger formation. A beveled gear wheel 22 is fitted about the spindle 20 through a sleeve 23 so that, while the spindle will be constrained to rotate with the gear, it may slide through the gear as the drilling progresses. The portion of the spindle between the bearing arms 19 is angular in cross section and the sleeve has a bore of corresponding form. The sleeve is composed of mating members secured together around the spindle and containing rollers 23' to bear upon the sides of the spindle and thereby reduce frictional wear, while the gear 22 is secured rigidly to the sleeve in any preferred or convenient manner. The beveled gear 22 meshes with a beveled pinion 24 secured upon the inner end of a shaft 25 which is journaled in suitable bearings upon the supporting frame and the adjacent standard 13, and the pulley 4 previously mentioned is secured upon the outer end of the said shaft 25. It is obvious that, when motion is imparted to the shaft 25 from the pulley 2 through the belt 3 and pulley 4, the said motion will be transmitted directly to the drill spindle through the gear 22, and the spindle rotated so that the drill or auger will bore into the earth and form the post hole.

Upon the lateral side of the drill frame 18 more remote from the pulley 4 and the drill spindle, I provide a rack 26 with which meshes a pinion 27 on the rear end of a shaft 28 which is journaled in suitable bearings upon the supporting frame 15. A feather or spline 29 is provided upon the shaft 28 and a sleeve 30 is fitted upon the shaft and said feather so that, while the sleeve may move endwise along the shaft, it will be constrained to rotate therewith, and at the ends of the said sleeve are friction pulleys 31 and 32 which are adapted to bear upon the face of a driving friction pulley 33. The said pulley 33 is carried by a shaft 34 disposed transversely upon the supporting frame and journaled in a suitable bearing thereon and equipped at its inner end with a beveled gear 35 meshing with a similar gear 36 upon a transmission shaft 37 which is also journaled in suitable bearings upon the supporting frame. The shaft 37 extends rearwardly to a point adjacent the main beveled gear 22 and at its rear end is equipped with a beveled pinion 38 meshing with said gear 22 so that, when the drill is operating properly, adjustment of the sleeve 30 and the friction pulleys carried thereby will cause motion to be transmitted from the friction disk 33 to the pinion 27 and thence to the rack 26 so that the drill frame will be raised or lowered. To shift the sleeve 30 and the friction disks or pulleys carried thereby, I provide a lever 39 which may be easily reached from the seat on the tractor, is fulcrumed in any convenient manner upon the supporting frame, and is equipped with a fork 40 engaging the sleeve 30 in a well-known manner.

The construction and arrangement of the several parts being thus made known, it is thought the operation of the same will be readily understood. The tractor is driven to a position adjacent the location of the contemplated post hole and is then properly manœuvered so as to bring the drill or auger 21 over the point where the post hole is to be dug. The power of the tractor engine is then applied to the pulley 2 in the usual manner so that motion will be transmitted through the belt 3 to the pulley 4 and the driving shaft 25. Inasmuch as the shaft 25 is geared directly to the drill spindle, the said spindle and auger or drill bit will be rotated and this rotation will continue uninterruptedly, it being understood that the formation of the bit or auger is of the helical type so that the progress of the bit into the ground will be smooth and easy and the dirt will be fed upwardly over the helical blade to the surface of the ground. The rotation of the drill or auger as it is withdrawn from the ground will not be detrimental to the drill inasmuch as the greater quantity of the earth will be fed from the formed hole in the manner just stated, and if the soil should be of a hard sticky character, the rotation of the drill as it is withdrawn will serve to loosen the soil and thereby facilitate any subsequent supplemental excavating which may be necessary. When the members of the friction gearing are in the position shown in Figs. 2 and 4, no motion will be imparted to the shaft 28 and the drill frame will remain stationary. When the drilling operation is to be performed, the sleeve 30 is shifted through manipulation of the lever 39 so that the disk or pulley 32 will be brought into engagement with the driving friction pulley 33 and motion will be thence transmitted to the pinion 27 and rack 26 to cause a downward movement of the drill frame. The initial downward movement of said frame should, of course, be rather rapid so that the end of the drill or auger will be quickly brought into engagement with the surface of the ground. When the actual boring begins, of course, the speed of descent cannot be so great and the sleeve 30 will, therefore, be adjusted to bring the disk 32 close to the center of the disk 33, and the speed of the pinion 27 and the rack 26 minimized. The operator by watching the progress of the work may regulate the speed of descent according to any given circumstances, as obviously if the soil is of a sandy quality it may be penetrated more readily than if it be of a heavy sticky clay-like consistency. When the boring has reached the desired depth, the sleeve 30 is shifted so as to disengage the disk 32 from the disk 33 and bring the disk 31 into working position, the rotation of the pinion 27 being thereby reversed and upward movement imparted to the rack 26 and the drill frame. This movement, of course, may be as rapid as the operator desires so that the drill will be quickly withdrawn from the formed hole.

It will be readily noted that I have provided a compactly arranged and efficient post-hole digger which may be readily moved from point to point and operated by power from the moving agent so that any desired number of post holes may be dug with a minimum expenditure of time and labor.

Having thus described the invention, what is claimed as new is:

A post-hole digger comprising a wheeled axle, a main frame erected upon and over the axle, a channeled guide extending vertically on the back of the frame, a drill frame, a T-rib on the front of the drill frame slidably engaging in the channeled guide, a drill having a spindle journaled in the drill frame, a gear fitted on the drill spindle to drive the same, the spindle being slidable through the gear, a driving shaft mounted transversely on the main frame and operatively connected with said gear, a longitudinal shaft mounted on the main frame in front of the drill frame and actuated by said gear, an intermediate shaft mounted transversely on the main frame and geared to said longitudinal shaft, a second longitudinal shaft mounted on the main frame and having its rear end disposed adjacent the drill frame, means whereby the second longitudinal shaft may be driven in either direction by the intermediate shaft, a pinion on the rear end of the second longitudinal shaft, and a rack on the adjacent lateral side of the drill frame meshing with said pinion.

In testimony whereof I affix my signature.

FRANK A. YEZEK. [L. S.]